(No Model.)

J. F. SHAW.
FIRE ESCAPE.

No. 455,364.  Patented July 7, 1891.

Witnesses:
Fred M. Coffin
Byron Smith

Inventor:
John F. Shaw
By Frederick J. Allen,
Attorney.

UNITED STATES PATENT OFFICE.

JOHN F. SHAW, OF AUBURN, NEW YORK.

FIRE-ESCAPE.

SPECIFICATION forming part of Letters Patent No. 455,364, dated July 7, 1891.

Application filed January 19, 1891. Serial No. 378,201. (No model.)

*To all whom it may concern:*

Be it known that I, JOHN F. SHAW, of the city of Auburn, New York, am the inventor of certain new and useful Improvements in Fire-Escapes, of which the following is a description, reference being had to the accompanying drawings, forming part of this specification.

My invention relates to that class of fire-escapes which permits a lowering line or cable to be passed or paid out slowly enough to lower a person safely thereby; and my invention consists in mechanism adapted to accomplish this result.

Figure 1:
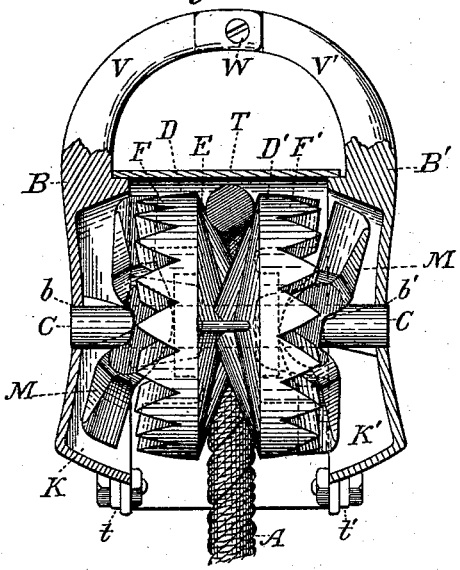
Figure 2:
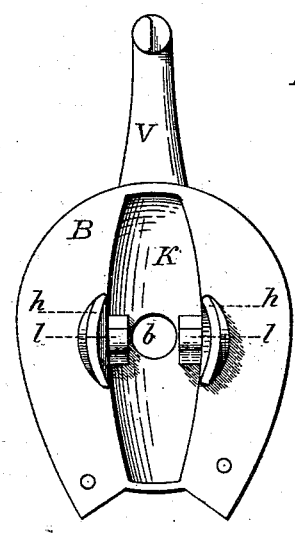
Figure 4:
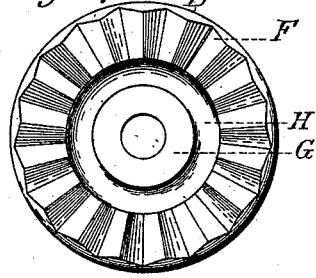
Figure 3:
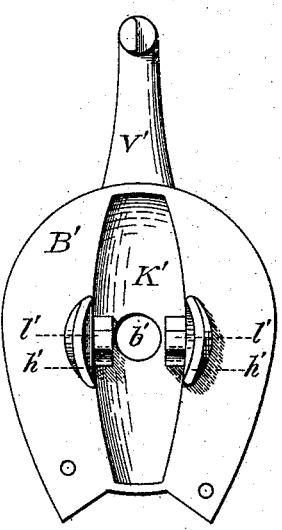
Figures 5, 6:
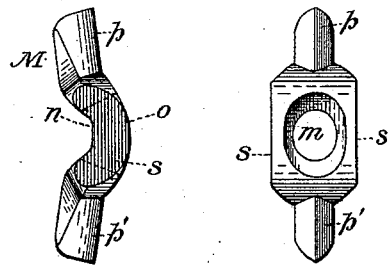

In the drawings, Figure 1 shows a side view of my device partly in section, one-half of the inclosing casing being removed. Figs. 2 and 3 show the interior faces of the two side plates. Fig. 4 shows the face of the wheel or drum, and Figs. 5 and 6 show side and front views of the pawl or detent.

My invention consists of a supporting-frame B B', provided with journals $b$ $b'$, which receive the ends of a shaft C. The shaft C supports a wheel or drum D D', which is preferably secured to turn with said shaft and which has a recess E therein adapted to receive the lowering-line A, and preferably ribbed to prevent any possible slip of this line. The opposite faces of this drum D D' are provided with circular racks of triangular teeth, as shown in Figs. 1 and 4, the number of teeth in each rack being uneven and the teeth of each rack being set one-fourth of the width of a tooth from the position of the teeth of the opposite rack for a purpose hereinafter described. A hub G for the drum is used to give a better bearing for it upon its shaft C. The drum is supported to prevent endwise movement by segmental lugs $h$ $h$ and $h'$ $h'$, which project from the side plates B and B', respectively, as shown, and the crowns of these lugs engage the annular depression (shown at H, Fig. 4) and its counterpart upon the opposite face of the drum.

The side plates B B' are recessed, as shown at K K', and in these recesses are placed the rocking bearings $l$ $l$ and $l'$ $l'$. A pawl or detent M is slotted centrally at $m$, Fig. 6, so as to encircle the shaft C. At its back a depression $n$, Fig. 5, is formed to permit the pawl to vibrate within the recess K upon the bearings $l$ $l$, (or $l'$ $l'$ of the opposite side, as the case may be.) The convex part $o$ of the pawl is in loose contact with the hub G of the drum. At each end of the pawl is a tooth $p$ $p'$, of triangular section, adapted to fit between two adjacent teeth of one of the racks, and the longitudinal axis of the pawl is curved, as shown in Fig. 5, to enable the pawl, in rocking upon its bearings $l$ $l$ or $l'$ $l'$, to engage at one tooth, as $p$, and clear the tooth, as $p'$, at its other end from the rack. The curvature of the pawl, however, is such as only to clear at one end when the other is deeply engaged in the rack, and as the engaged end is forced backward out of engagement upon revolving the drum by force of the inclined faces of the rack-teeth upon the slopes of the pawl-teeth the free end of the pawl must engage before the engaged end clears, so that the operation is in the nature of an escapement. The object in advancing one rack one-fourth of a tooth ahead of the other is to make the leap ahead of the drum from one engagement to another as small as possible. The sides of the pawl are made plane, and as it is only loosely fitted around the shaft it is pressed sidewise by the revolution of the drum, and the surfaces $s$ $s$ move with some friction against the sides of the recess K. This friction is some function of the weight lowered, and by means of it light or heavy weights appear to be lowered at about the same rate of speed.

A covering-plate T is used to keep foreign matters out of the mechanism, and although not necessary, yet, as shown, it affords a substitute for pillars between the side plates B B', its ears $t$ $t'$ being secured to these plates respectively.

A handle or bail $v$ $v'$ is provided, whereby the device may be suspended, and these are preferably made as extensions of the plates B B' and secured together by a bolt, rivet, or screw $w$, as shown.

The operation is as follows: A line of proper strength is passed over the drum and once around it, leaving both ends free. The person or weight to be lowered is properly secured to one of the free ends of this line, the mechanism working equally well in either direction, and this weight causes the drum to turn and pay out the line. As the drum turns, the pawls are rapidly vibrated by the pressure of the inclined rack-tooth faces with the inclined faces of the teeth of the pawls, and the rate of vibration of the pawls being limited by the friction of the surfaces s s against the interior faces of the recesses K and lugs h h the drum revolves only at a moderate rate of speed and lowers the person or weight slowly and in safety.

If one of the pawls or detents is removed from my device, it will operate nearly as well as with both, or the device might be constructed with only one circular rack on the drum; but in this case the step ahead of the drum would amount to one-half the width of a rack-tooth, instead of one-quarter, as it is when constructed as hereinabove described, and the descent of the person or weight becomes more jerky, whereas this descent is very steady and free from jerks when two racks and detents are used.

The use of the double arrangement above has the additional effect to make the draft central upon the mechanism, thereby avoiding any tendency to lateral displacement of the device or its parts.

What I claim as new, and desire to secure by Letters Patent, is—

1. In a fire-escape, the combination of a supporting-frame provided with journals, a shaft supported in said journals which carries a drum or wheel having a circular rack upon one of its faces, and a pawl or detent provided with a tooth at each end and with a bearing at a point midway between said teeth, whereby it is adapted to vibrate upon said bearing and engage the teeth of the circular rack alternately at either end, said pawl or detent being supported by the frame to prevent it from rotating with said rack.

2. In a fire-escape, the combination of a supporting-frame provided with journals, a shaft supported in said journals and carrying a wheel or drum which has two circular racks upon its opposite faces, the teeth of said racks being uneven in number and one rack being set one-fourth of the width of one of its teeth in advance of the other, and a pair of pawls or detents supported by bearings at points midway their lengths and provided with teeth at their ends and supported by said frame so as not to follow the revolution of said wheel or drum, while they can vibrate upon their said bearings to engage at either end with the teeth of said racks.

3. In a fire-escape, the combination, with a wheel or drum provided with a circular rack or racks, of one or more pawls or detents adapted to engage said rack or racks, respectively, and pierced centrally to permit the shaft of said drum to pass therethrough, so that said pawl may vibrate upon said shaft, but is restrained from moving in the direction of its length, and a shaft for said drum or wheel.

4. In a fire-escape, the pawl or detent M, having a central aperture $m$ loosely fitting the shaft C, whereby it may vibrate upon said shaft, but is restrained from moving endwise, having also teeth $p\ p'$ at its extremities, and a rocking bearing $n$ midway between said teeth, in combination with a ratcheted drum.

5. In a fire-escape, the pawl or detent M, pierced centrally, as at $m$, and having the teeth $p\ p'$, bearing $n$, and friction-surfaces $s\ s$, in combination with a ratcheted drum.

6. In a fire-escape, the pawl or detent M, provided with the aperture $m$, teeth $p\ p'$, bearing $n$, and friction-surfaces $s\ s$, in combination with a supporting-frame having bearings $l\ l$, fitted to engage with the bearing $n$, and lugs $h\ h$, adapted to engage with the surfaces $s\ s$ of the pawl or detent, in combination with a ratcheted drum.

JOHN F. SHAW.

Witnesses:
FRED M. COFFIN,
FREDERICK I. ALLEN.